(12) United States Patent
Kanai

(10) Patent No.: US 9,003,026 B2
(45) Date of Patent: Apr. 7, 2015

(54) COMMUNICATION DEVICE, COMMUNICATION SYSTEM, SETTING METHOD, SETTING PROGRAM, AND SETTING CIRCUIT

(75) Inventor: Hiroya Kanai, Tokyo (JP)

(73) Assignee: NEC Corporation, Tokyo (JP)

( * ) Notice: Subject to any disclaimer, the term of this patent is extended or adjusted under 35 U.S.C. 154(b) by 293 days.

(21) Appl. No.: 13/581,806

(22) PCT Filed: Mar. 29, 2011

(86) PCT No.: PCT/JP2011/001844
§ 371 (c)(1),
(2), (4) Date: Aug. 30, 2012

(87) PCT Pub. No.: WO2011/121987
PCT Pub. Date: Oct. 6, 2011

(65) Prior Publication Data
US 2012/0331136 A1 Dec. 27, 2012

(30) Foreign Application Priority Data
Mar. 31, 2010 (JP) .................. 2010-083585

(51) Int. Cl.
*G06F 15/173* (2006.01)
*H04L 12/26* (2006.01)
(Continued)

(52) U.S. Cl.
CPC .............. *H04L 43/10* (2013.01); *H04L 12/4641* (2013.01); *H04L 12/12* (2013.01);
(Continued)

(58) Field of Classification Search
CPC ..... G06F 3/067; G06F 3/0689; G06F 3/0665; G06F 11/142; G06F 11/1469; G06F 11/1471; G06F 21/10; G06F 3/0632; G06F 3/0635; G06F 3/0653; G06F 11/3485; G06F 3/0605; G06F 3/0608; G06F 3/0614
USPC ......... 709/203, 206–207, 218–219, 223–229, 709/250
See application file for complete search history.

(56) References Cited

U.S. PATENT DOCUMENTS 7,996,889 B2 * 8/2011 Tsuchida ........................ 726/9
2007/0014290 A1 1/2007 Dee et al.
(Continued)

FOREIGN PATENT DOCUMENTS

CN 101651575 2/2010
JP 2008-244907 10/2008
(Continued)

OTHER PUBLICATIONS

International Search Report PCT/JP2011/001844 dated Apr. 26, 2011, with English translation.
(Continued)

*Primary Examiner* — Zarni Maung
(74) *Attorney, Agent, or Firm* — Young & Thompson

(57) ABSTRACT

In order to automatically set information of a maintenance entity group end point device into a communication device only by using periodically transmitted and received supervision frames without the need for a specifically defined frame, a maintenance entity group end point device is equipped with: a receiving unit for receiving supervision frames; a management table for managing identification information of the maintenance entity group end point devices that are transmission sources of the supervision frames; and a registering unit for, in a case that identification information of a maintenance entity group end point device that is a transmission source of a supervision frame received by the receiving unit is not registered in the management table, registering the identification information of the maintenance entity group end point device into the management table.

9 Claims, 12 Drawing Sheets

(51) Int. Cl.
*H04L 12/12* (2006.01)
*H04L 12/24* (2006.01)
*G06F 12/00* (2006.01)
*H04L 12/46* (2006.01)

(52) U.S. Cl.
CPC ............ *H04L43/0805* (2013.01); *Y02B 60/34* (2013.01); *Y02B 60/33* (2013.01); *H04L 41/0213* (2013.01); *H04L 41/0893* (2013.01)

(56) References Cited

U.S. PATENT DOCUMENTS

| | | | | |
|---|---|---|---|---|
| 2007/0220249 | A1* | 9/2007 | Gryck et al. | 713/100 |
| 2008/0114649 | A1* | 5/2008 | Swirsky et al. | 705/14 |
| 2008/0275991 | A1* | 11/2008 | Matsuzaki et al. | 709/225 |
| 2008/0309464 | A1* | 12/2008 | Chihara | 340/10.42 |
| 2009/0006650 | A1 | 1/2009 | Saito | |
| 2009/0043876 | A1* | 2/2009 | Zhang et al. | 709/223 |
| 2009/0119719 | A1* | 5/2009 | Matsuzaki et al. | 725/74 |
| 2009/0161672 | A1 | 6/2009 | Shimada | |
| 2009/0176575 | A1* | 7/2009 | Terao et al. | 463/42 |

FOREIGN PATENT DOCUMENTS

| | | |
|---|---|---|
| JP | 2008-306467 | 12/2008 |
| JP | 2009-010668 | 1/2009 |
| JP | 2009-135625 | 6/2009 |
| JP | 2009-152727 | 7/2009 |

OTHER PUBLICATIONS

Chinese Official Action—201180012558.6—May 28, 2014.

* cited by examiner

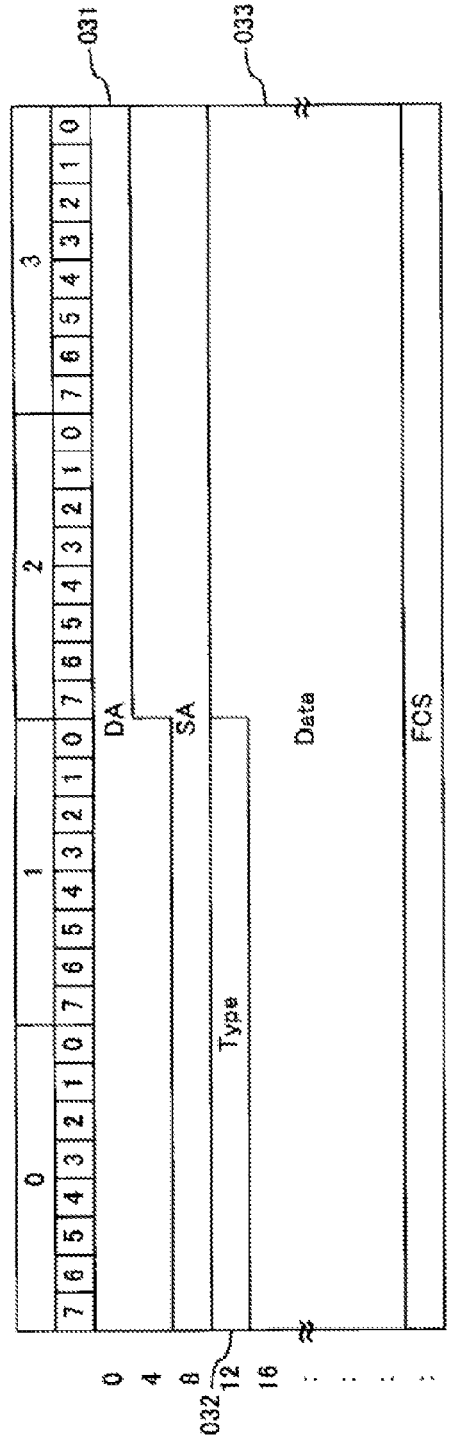

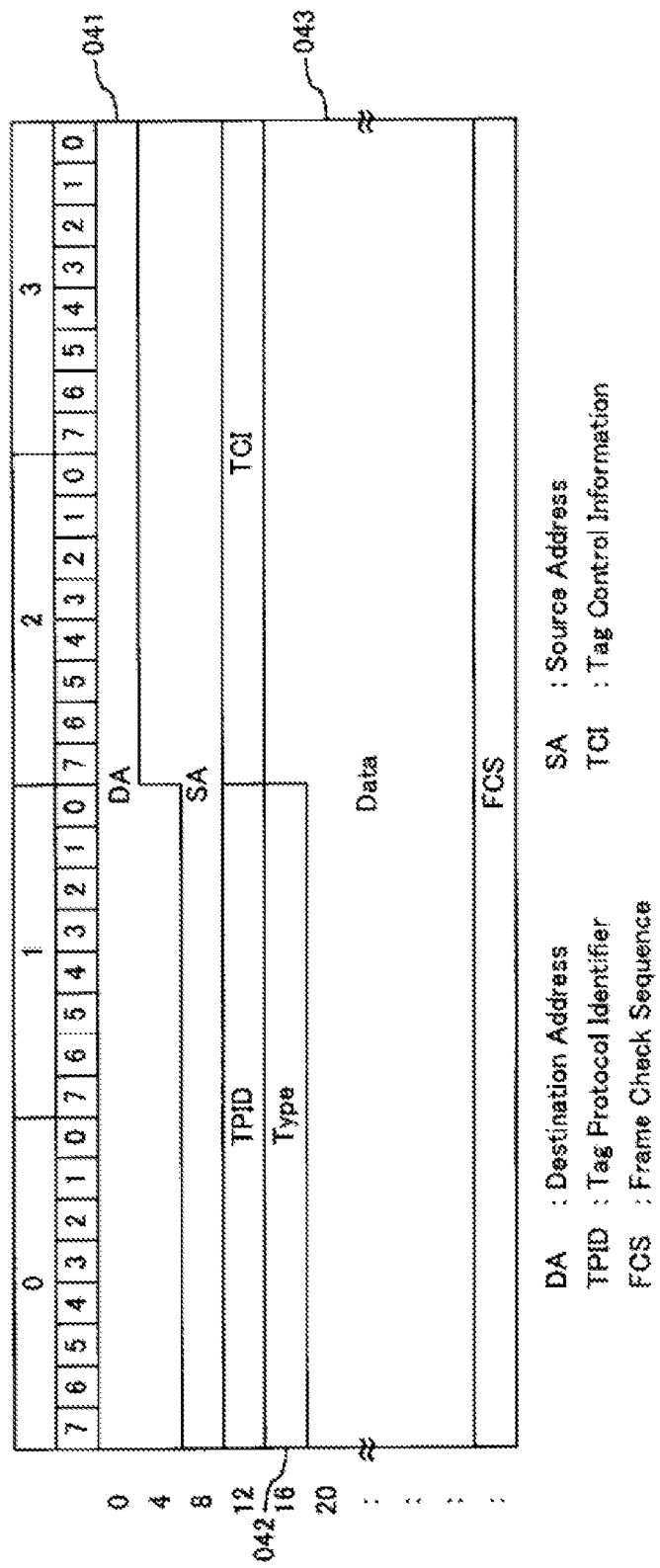

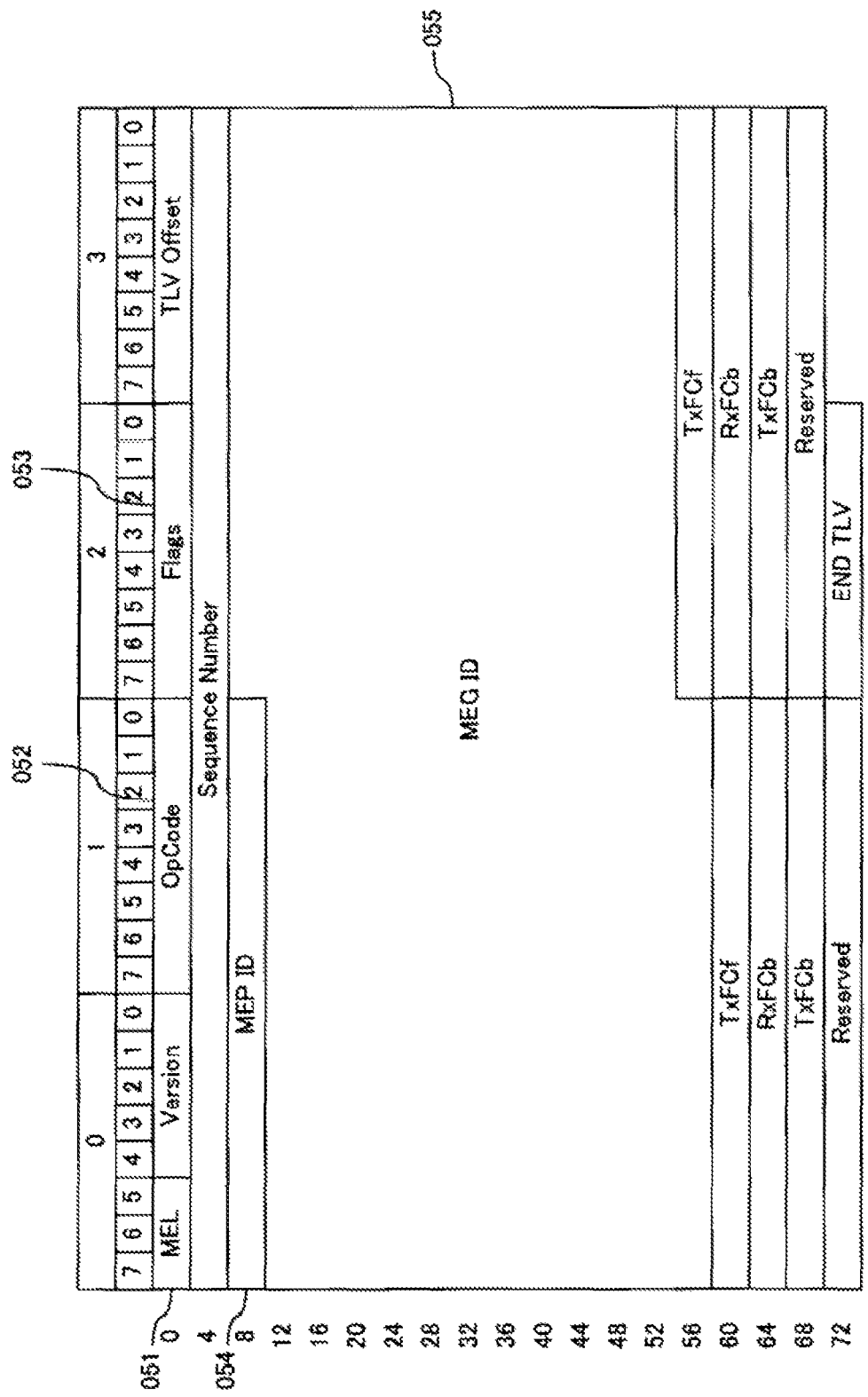

RDI : Remote Defect Indication

Fig.9

| Entry | MEL | MEG ID | Period | MEP ID | Peer MEP ID | NUMBER OF RECEPTIONS A | PROTECTION TIMER B | REGISTRATION STATUS |
|---|---|---|---|---|---|---|---|---|
| MEP 1 | 091-1<br>5 | 091-2<br>MEG0000000001 | 091-3<br>1s | 091-4<br>1000 | 091-5<br>1001 | 091-6<br>3 | 091-7<br>0s | 091-8<br>REGISTERED |
| MEP 2 | | | | | | | | 092-8<br>UNREGISTERED |
| MEP 3 | | | | | | | | 093-8<br>UNREGISTERED |
| MEP 4 | | | | | | | | 094-8<br>UNREGISTERED |

NUMBER OF PROTECTIONS K = THREE TIMES

Fig.11

| Entry | MEL | MEG ID | Period | MEP ID | Peer MEP ID | NUMBER OF RECEPTIONS A | PROTECTION TIMER B | REGISTRATION STATUS | ... |
|---|---|---|---|---|---|---|---|---|---|
| MEP 1 | 111-1<br>5 | 111-2<br>MEG0000000001 | 111-3<br>1s | 111-4<br>1000 | 111-5<br>1001 | 111-6<br>3 | 111-7<br>xxs | 111-8<br>REGISTERED | ... |
| MEP 2 | 112-1<br>4 | 112-2<br>MEG0000000002 | 112-3<br>10ms | 112-4<br>1000 | 112-5<br>2001 | 112-6<br>1 | 112-7<br>0s | 112-8<br>PROVISIONALLY REGISTERED | ... |
| MEP 3 | | | | | | | | UNREGISTERED | ... |
| MEP 4 | | | | | | | | UNREGISTERED | ... |

NUMBER OF PROTECTIONS K = THREE TIMES

Fig.12

| Entry | MEL | MEG ID | Period | MEP ID | Peer MEP ID | NUMBER OF RECEPTIONS A | PROTECTION TIMER B | REGISTRATION STATUS | ... |
|---|---|---|---|---|---|---|---|---|---|
| MEP 1 | 121-1<br>5 | 121-2<br>MEG0000000001 | 121-3<br>1s | 121-4<br>1000 | 121-5<br>1001 | 121-6<br>3 | 121-7<br>xxs | 121-8<br>REGISTERED | ... |
| MEP 2 | 122-1<br>4 | 122-2<br>MEG0000000002 | 122-3<br>10ms | 122-4<br>1000 | 122-5<br>2001 | 122-6<br>3 | 122-7<br>0s | 122-8<br>REGISTERED | ... |
| MEP 3 | | | | | | | | UNREGISTERED | ... |
| MEP 4 | | | | | | | | UNREGISTERED | ... |

NUMBER OF PROTECTIONS K = THREE TIMES

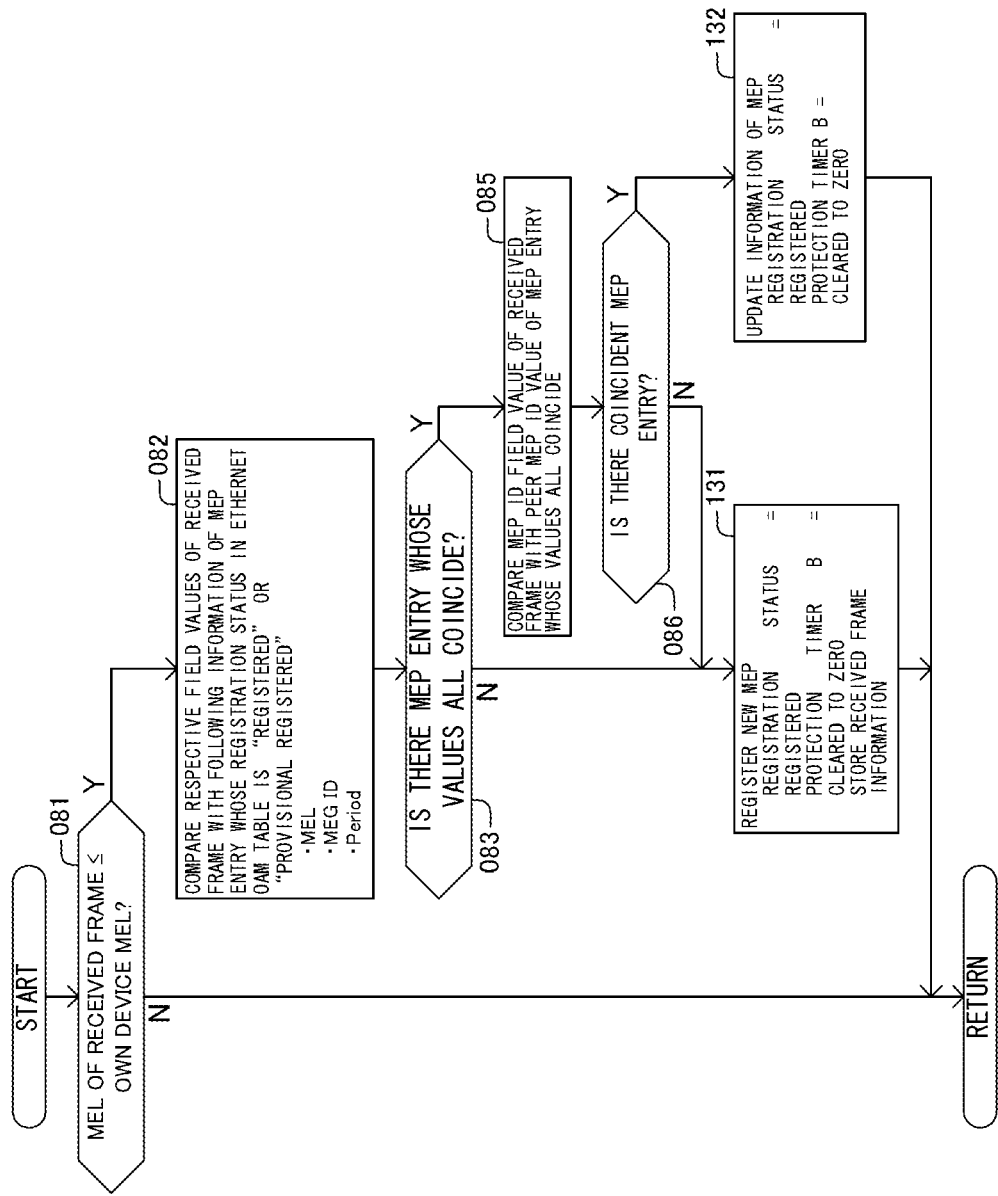

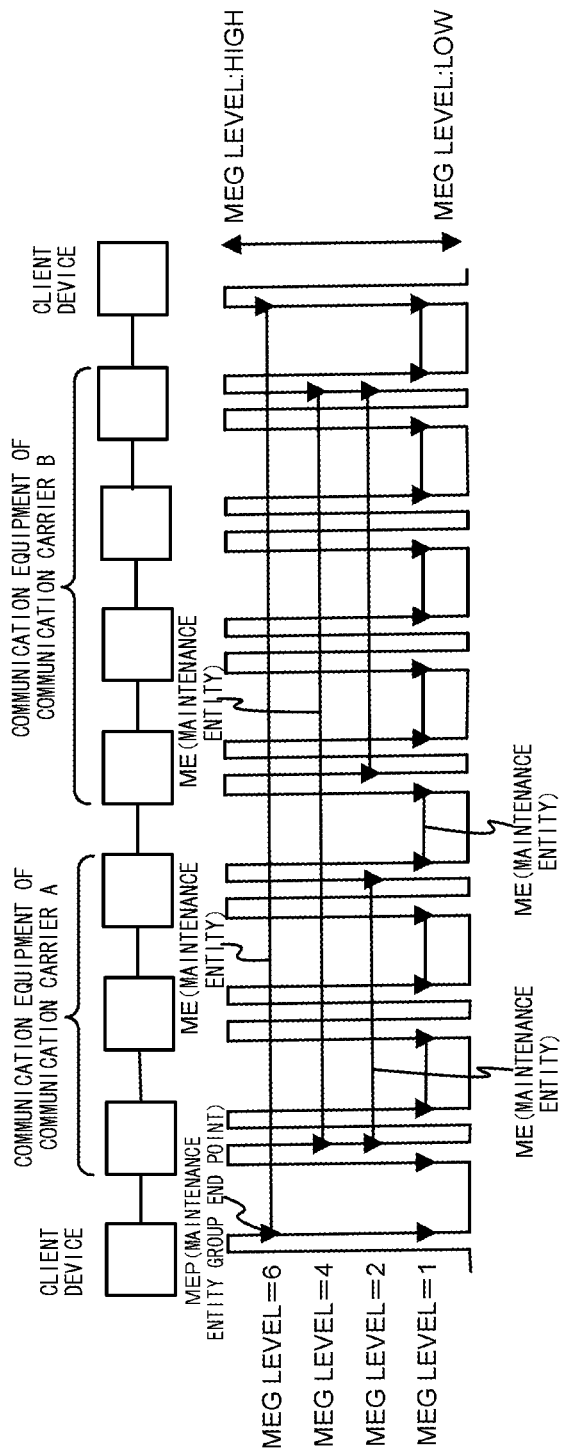

COMMUNICATION DEVICE, COMMUNICATION SYSTEM, SETTING METHOD, SETTING PROGRAM, AND SETTING CIRCUIT

TECHNICAL FIELD

The present invention relates to a communication device, a communication system, a setting method, a setting program and a setting circuit, which are used in a network to supervise the status of the network by transmitting and receiving supervision frames every predetermined time between maintenance entity group end point devices.

BACKGROUND ART

Ethernet OAM (Operation Administration and Maintenance) used for operation administration and maintenance in Ethernet™ is specified by ITU-T (International Telecommunication Union Telecommunication Standardization Sector) Y.1731 and IEEE (Institute of Electrical and Electronic Engineers) 802.1ag. In Ethernet OAM, a supervision section is called an ME (Maintenance Entity), and an ME can be set for every MEG (Maintenance Entity Group) level. As MEG levels, eight supervision levels 0 to 7 are specified. Moreover, there is a need to set MEPs (Maintenance entity group End Points) as end points at both ends of a supervision section (an ME).

In FIG. 15, a setting example of MEs and MEPs is shown. As shown in FIG. 15, an ME (a supervision section) is set between devices, and MEPs (end points) shown by black inversed triangles are set at both ends of the supervision section.

Further, an ME and an MEP have an MEG level as an attribute, and are specified so that an ME with a lower MEG level does not overlie an ME with a higher MEG level as shown in FIG. 15.

Therefore, in the case of operating an Ethernet OAM frame to perform operation administration and maintenance, there is a need to preliminarily register, into each of Ethernet communication devices at MEP positions of each supervision section (ME), an MEP in an MEG level of the ME. Moreover, there is a case that an MIP (Maintenance Intermediate Point) that relays a supervision frame is registered in an Ethernet communication device connecting between MEPs.

Further, for shortening a fault detection time from occurrence of a unidirectional link fault, there is a device that transmits and receives link normality check frames that are specifically defined therefor and, when a destination table is searched based on destination information of the frames and consequently a corresponding entry does not exist, newly acids a destination to the destination table as a general learning process (e.g., refer to Patent Document 1).

Further, there is a device that, regarding a link aggregation management table managing the configuration of link aggregation in a layer-2 switch, when a fault occurs in a port belonging to one link aggregation group, causes another line card having the port belonging to the one link aggregation group to update the link aggregation management table (e.g., refer to Patent Document 2).

[Patent Document 1] Japanese Unexamined Patent Application Publication No. 2009-135625
[Patent Document 2] Japanese Unexamined Patent Application Publication No. 2008-244907

However, since there is a need to individually set registration information into the respective Ethernet communication devices in the MEP positions of each ME in a network at the time of the aforementioned MEP registration, it is required to set by connecting a maintenance terminal to each of the Ethernet communication devices or connect a memory card containing registration information to each of the Ethernet communication devices and load the registration information.

Consequently, for registration of an MEP, each of the Ethernet communication devices needs to be equipped with an interface and CPU (Central Processing Unit) for setting of registration information, and there is a fear that a circuit becomes large-scale and power consumption and cost increase.

Further, since the registration information of the MEP to be registered into each of the Ethernet communication devices is in large amounts and complicated, there is also a fear of wrong setting of the registration information.

Further, addition of a destination to the destination table in the aforementioned Patent Document 1 is simple increase of the number of destinations in the table to shorten a fault detection time and is performed as a general learning process, and setting of a device is not performed in consideration of simplification of a circuit or reduction of cost.

Further, in order to shorten a fault detection time, specifically defined link normality check frames are transmitted and received, but periodic use of supervision frames is not taken into consideration.

Further, the aforementioned Patent Document 2 shows a table update operation when a fault is detected in transmission and reception of usual frames, but use of supervision frames periodically transmitted and received or automatic setting of a device is not take into consideration.

SUMMARY

The present invention has been made in view of such a circumstance, and an object of the present invention is to provide a communication device, a communication system, a setting method, a setting program and a setting circuit, which are capable of automatically setting information as a maintenance entity group end point device by only using supervision frames periodically transmitted and received without the need for specifically defined frames and are capable of achieving simplification of a circuit and reduction of cost.

In order to achieve the object, a communication device according to the present invention is a communication device used for a communication system performing supervision of a network status by transmitting and receiving supervision frames between maintenance entity group end point devices every predetermined time, and the communication device includes: a receiving means for receiving the supervision frames; a management table for managing identification information of the maintenance entity group end point devices that are transmission sources of the supervision frames; and a registering means for, in a case that identification information of a maintenance entity group end point device that is a transmission source of a supervision frame received by the receiving means is not registered in the management table, registering the identification information of the maintenance entity group end point device into the management table.

Further, a communication system according to the present invention is a communication system performing supervision of a network status by transmitting and receiving supervision frames between maintenance entity group end point devices every predetermined time, and at least one communication device in the communication system includes: a receiving means for receiving the supervision frames; a management table for managing identification information of the maintenance entity group end point devices that are transmission sources of the supervision frames; and a registering means for, in a case that identification information of a maintenance entity group end point device that is a transmission source of a supervision frame received by the receiving means is not registered in the management table, registering the identification information of the maintenance entity group end point device into the management table.

Further, a setting method according to the present invention is a setting method in a communication system performing supervision of a network status by transmitting and receiving supervision frames between maintenance entity group end point devices every predetermined time, and at least one communication device in the communication system comprises a management table for managing identification information of the maintenance entity group end point devices that are transmission sources of the supervision frames, and the setting method includes: receiving the supervision frames, by the communication device; and in a case that identification information of a maintenance entity group end point device that is a transmission source of a supervision frame received in the receiving is not registered in the management table, registering the identification information of the maintenance entity group end point device into the management table.

Further, a setting program according to the present invention is a setting program of a communication device used for a communication system performing supervision of a network status by transmitting and receiving supervision frames between maintenance entity group end point devices every predetermined time, and the communication device includes a management table for managing identification information of the maintenance entity group end point devices that are transmission sources of the supervision frames, and the setting program includes instructions for causing a computer of the communication device to execute: receiving the supervision frames; and in a case that identification information of a maintenance entity group end point device that is a transmission source of a supervision frame received by the receiving is not registered in the management table, registering the identification information of the maintenance entity group end point device into the management table.

Further, a setting circuit according to the present invention is a setting circuit of a communication device used for a communication system performing supervision of a network status by transmitting and receiving supervision frames between maintenance entity group end point devices every predetermined time, and the setting circuit includes: a receiving means for receiving the supervision frames; a management table for managing identification information of the maintenance entity group end point devices that are transmission sources of the supervision frames; and a registering means for, in a case that identification information of a maintenance entity group end point device that is a transmission source of a supervision frame received by the receiving means is not registered in the management table, registering the identification information of the maintenance entity group end point device into the management table.

Thus, according to the present invention, it is possible to automatically set information as a maintenance entity group end point device by only using supervision frames periodically transmitted and received without the need for specifically defined frames. Moreover, it is possible to achieve simplification of a circuit and reduction of cost.

BRIEF DESCRIPTION OF DRAWINGS

FIG. 2 is a view showing an example of stored information in an Ethernet OAM table 013;

FIG. 3 is a view showing an example of an IEEE802.1Q Untagged frame;

FIG. 4 is a view showing an example of an IEEE802.1Q Tagged frame;

FIG. 5 is a view showing contents of a Data field 033 of FIG. 3 and a Data field 043 of FIG. 4;

FIG. 9 is a diagram showing an example 1 of rewriting of information stored into the Ethernet OAM table 013;

FIG. 11 is a view showing an example 2 of rewriting of information stored into the Ethernet OAM table 013;

FIG. 12 is a view showing an example 3 of rewriting of information stored into the Ethernet OAM table 013;

FIG. 13 is a flowchart showing a process flow of automatic registration of an MEP according to another exemplary embodiment;

FIG. 15 is a view showing an example of setting of an ME and an MEP in a general Ethernet OAM.

EXEMPLARY EMBODIMENTS

Next, an exemplary embodiment in which a communication device, a setting method, a setting program and a setting circuit according to the present invention is applied to an Ethernet communication device operating an Ethernet OAM frame will be described in detail with reference to the drawings.

A feature of this exemplary embodiment is automatically registering an MEP for operating an Ethernet OAM frame to an Ethernet communication device. Moreover, another feature of this exemplary embodiment is automatically deleting the registered MEP.

Therefore, in this exemplary embodiment, it is possible to extract an Ethernet OAM frame for an own device from frames flowing in a network and automatically register an MEP to an Ethernet communication device based on frame information of the frame.

Moreover, it is also possible to automatically delete the registered MEP when an Ethernet OAM frame for the own device is not received for a given time.

Next, a basic configuration of this exemplary embodiment will be described.

In order to operate an Ethernet OAM function specified by ITU-T Y. 1731 or IEEE802.1ag, it is necessary to register an MEP to an Ethernet communication device.

Figure 1:
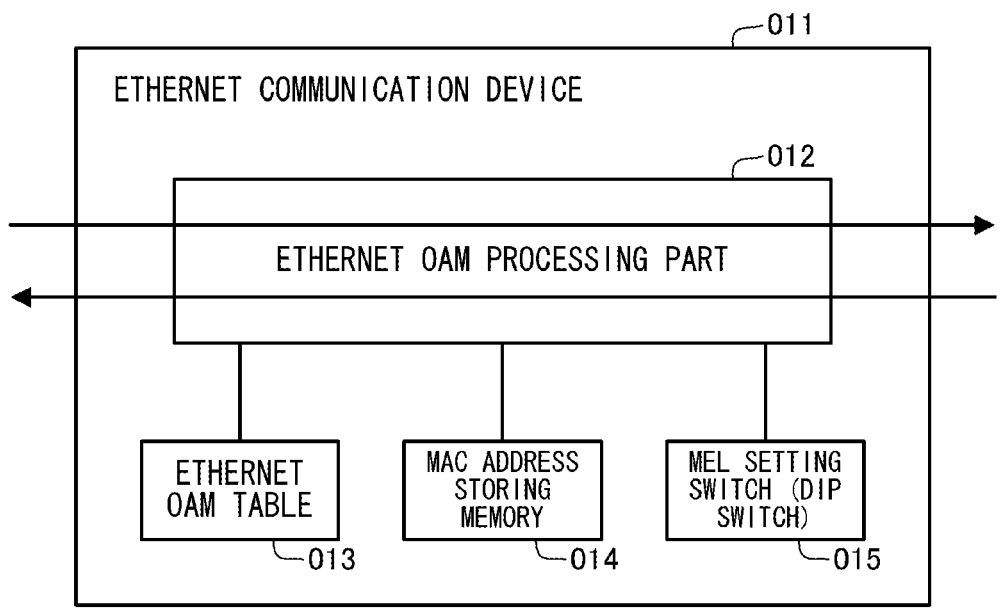
FIG. 1 is a block diagram showing an example of a configuration of an Ethernet communication device 011 as an exemplary embodiment of the present invention.

FIG. 1 is a block diagram showing the inside of an Ethernet communication device 011 as the exemplary embodiment of the present invention. Arrows represent the flow of Ethernet frames.

In order to operate the Ethernet OAM function, the Ethernet communication device is generally configured by an Ethernet OAM processing part 012, an Ethernet OAM table 013, and a MAC address storing memory 014. The present invention is realized by addition of a MEL (MEG Level) setting switch 015 such as a DIP switch and change of a method of processing by the Ethernet OAM processing part 012.

Figure 6:
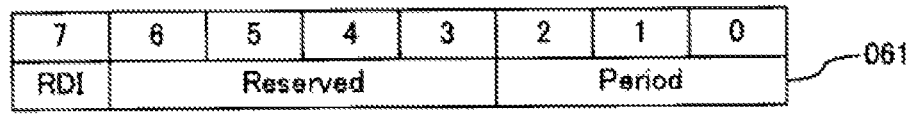
FIG. 6 is a view showing the details of a Flags field 053 of FIG. 5.

An example of stored information in the Ethernet OAM table 013 is shown in FIG. 2. It becomes possible to execute ETH-CC (Ethernet™ Continuity Check) based on this table information, and CCM (Continuity Check Message) frames are transmitted and received between MEPs registered to the Ethernet communication device. A frame format in Ethernet communication is specified by IEEE. An example of an IEEE802.1Q Untagged frame is shown in FIG. 3, and an example of an IEEE802.1Q Tagged frame is shown in FIG. 4. The CCM frame format is specified by ITU-T Y.1731 or IEEE802.1ag. The contents of a Data field 033 of FIG. 3 and a Data field 043 of FIG. 4 are as shown in FIG. 5. A Flags field 053 of FIG. 5 is shown in detail in FIG. 6.

Figure 7:
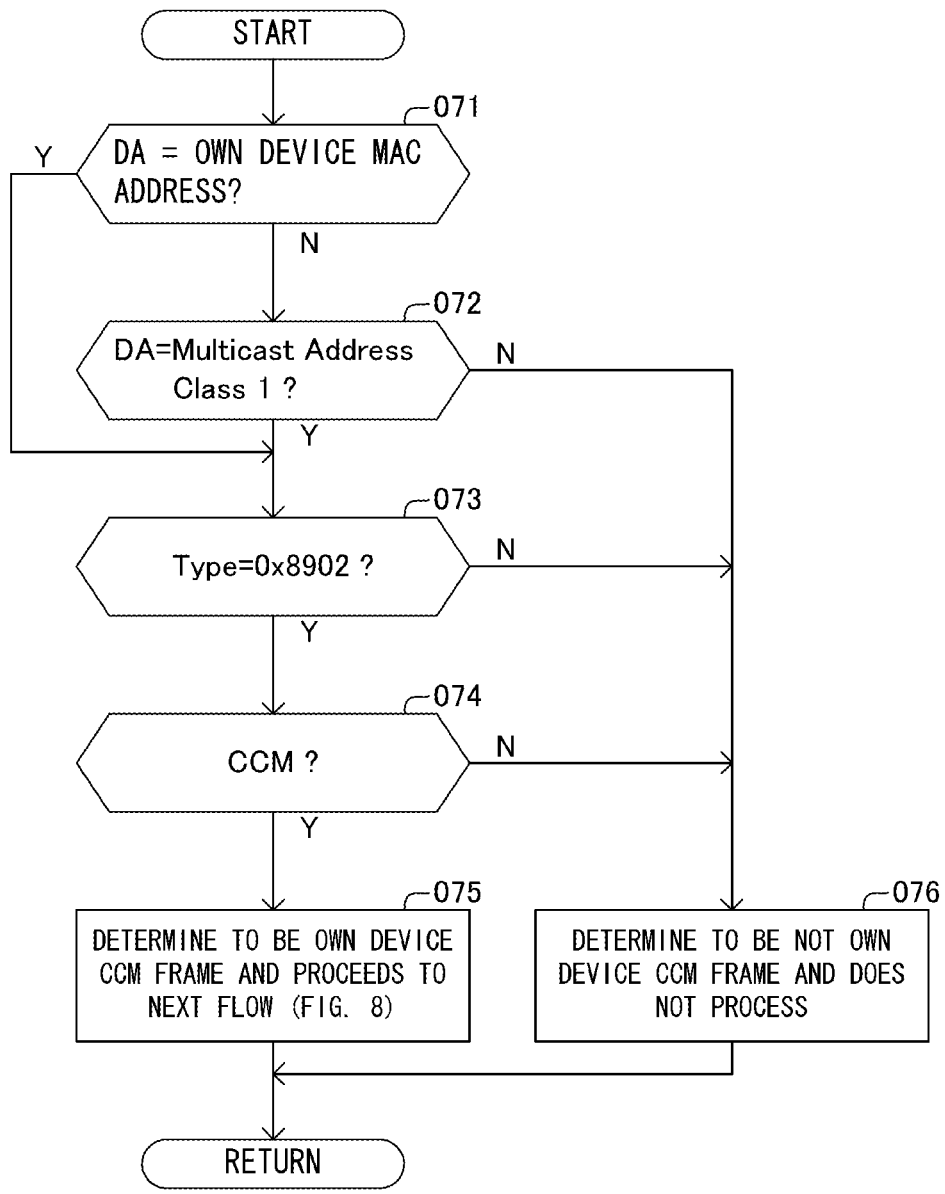
FIG. 7 is a flowchart showing a process of discriminating an own CCM frame in an Ethernet OAM processing part 012.
Figure 8:
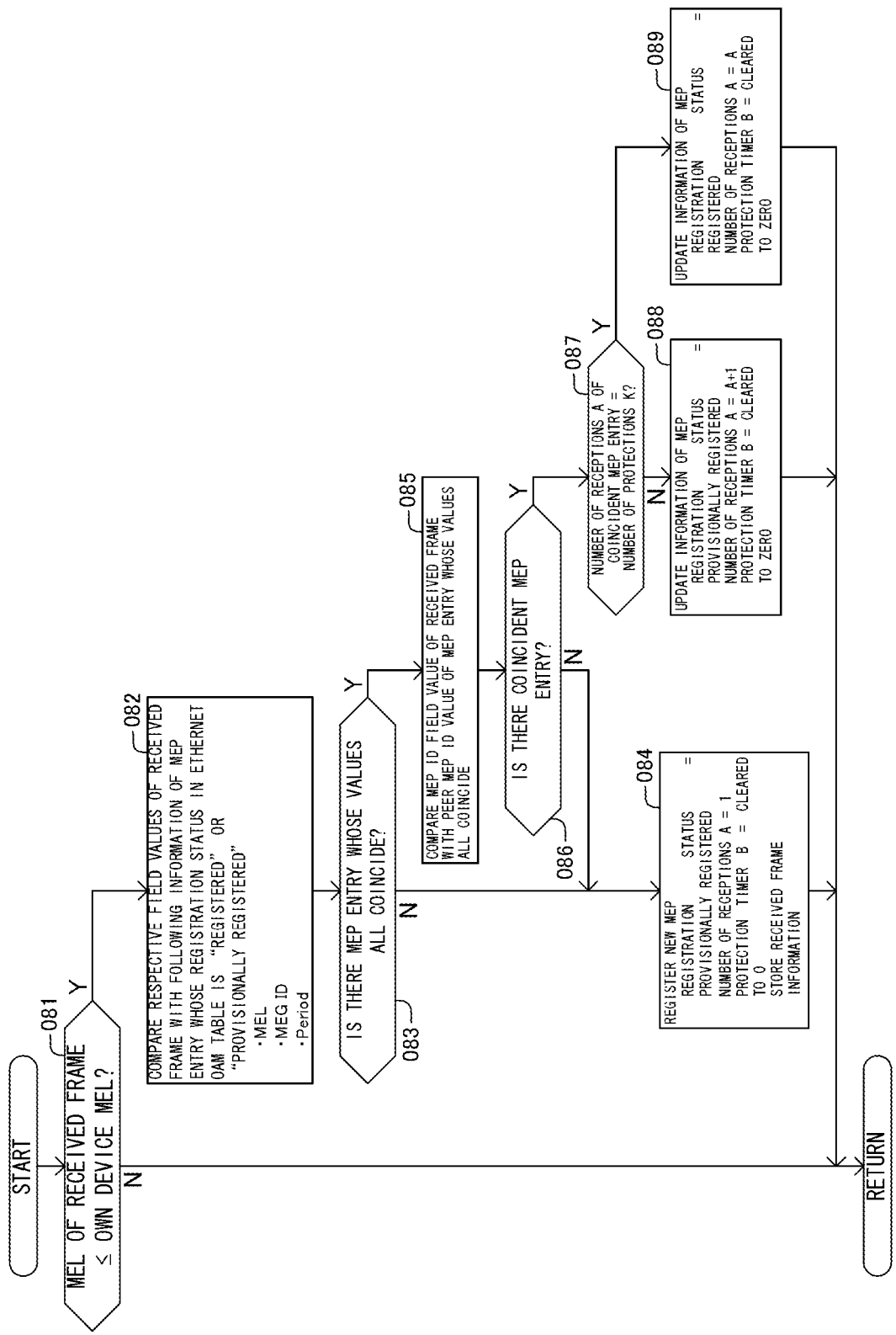
FIG. 8 is a flowchart showing a process flow of automatic registration of an MEP according to this exemplary embodiment.
Figure 10:
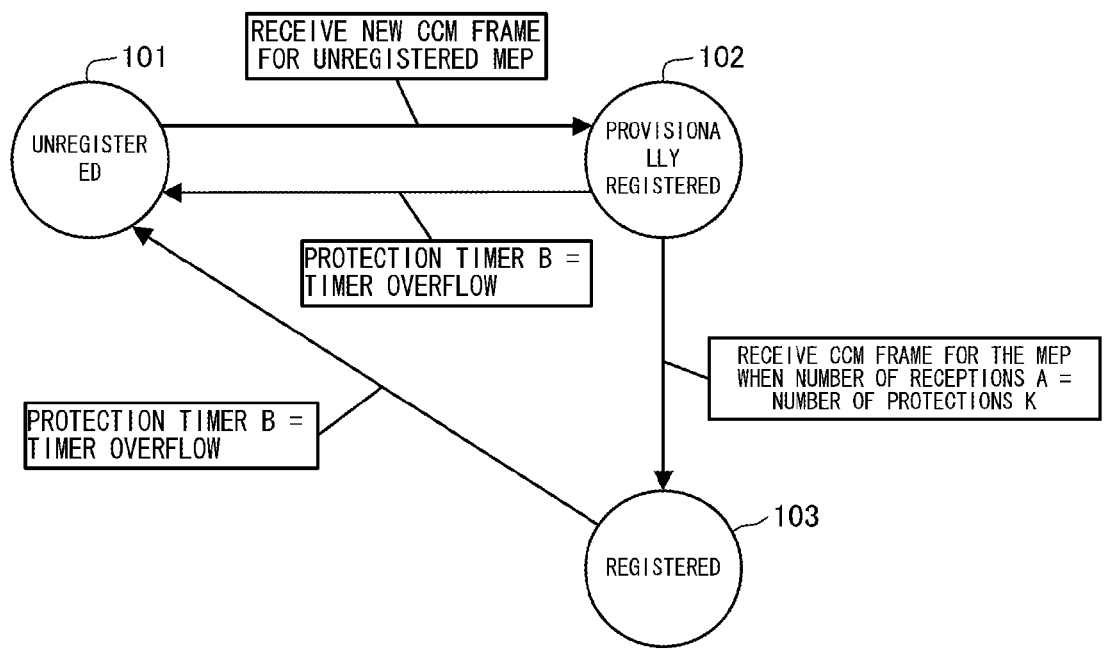
FIG. 10 is a diagram showing transition of a status of each MEP according to this exemplary embodiment.
Figure 14:
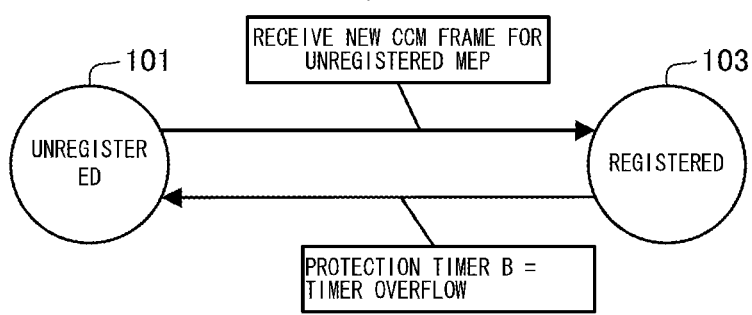
FIG. 14 is a diagram showing transition of a status of each MEP according to another exemplary embodiment.

A process flow in the present invention by the Ethernet OAM processing part 012 is shown in FIGS. 7 and 8. This process flow is shown as a flow of processing a frame for every reception thereof. Moreover, a diagram of a status transition at this moment is shown in FIG. 10. FIGS. 9, 11 and 12 show examples of rewriting of information stored into the Ethernet OAM table 013. A process flow of another exemplary embodiment is shown in FIG. 13, and a status transition diagram thereof is shown in FIG. 14.

Next, a configuration and operation of this exemplary embodiment will be described in detail with reference to FIGS. 1 and 2.

Ethernet frames flow in directions of the arrows on the Ethernet communication device 011 shown in FIG. 1. Every time receiving a frame, the Ethernet communication device 011 processes the received frame in the Ethernet OAM processing part 012. At this moment, respective information of the Ethernet OAM table 013, the MAC address storing memory 014 and the MEL setting switch 015 are used.

An example of stored information in the Ethernet OAM table 013 is shown in FIG. 2. In order to register an MEP in the Ethernet OAM function specified by ITU-T 11731 or IEEE802.1ag to an Ethernet communication device, it is necessary to configure an Ethernet OAM table as shown in FIG. 2 in the Ethernet communication device 011 and preliminarily set individual information into the Ethernet OAM table of each of the Ethernet communication devices in the network.

The content of the information in the Ethernet OAM table shown in FIG. 2 is an example. For each MEP Entry (identification information) that is a frame number of the Ethernet OAM table 013, information such as MEL, MEG ID, Period, MEP ID and Peer MEP ID are associated and stored. Based on this information, the ETH-CC function of the Ethernet OAM function becomes operable. The ETH-CC function is a function of checking the normality of a communication route by mutually transmitting CCM frames at given intervals among two or more MEPs and checking reception of the CCM frames at the respective MEPs.

Moreover, the Ethernet OAM processing part 012 identifies a transmission source MEP of the received CCM frame by MEP Entry with which the information contents are associated based on the information contents of the Ethernet OAM table 013.

The MAC address storing memory 014 stores a MAC address of the own device specified by IEEE. The same address does not exist in a network, and a MAC address is a unique value to a device.

The MEL setting switch 015 sets a MEL value that the Ethernet communication device 011 can process. When a frame that has a MEL value equal to or less than the value set by the MEL setting switch 015 is received, the frame is processed. When a frame having a value more than the set value, the frame is transmitted without being processed.

Next, an operation of this exemplary embodiment will be described. FIG. 7 shows a process flow for discriminating an own device CCM frame by the Ethernet OAM processing part 012.

Every time receiving a frame, the Ethernet OAM processing part 012 shown in FIG. 1 discriminates an own device CCM frame in accordance with the process flow shown in FIG. 7.

Upon reception of a frame, in a case that a DA (Destination Address) field (031, 041) of the received frame coincides with the MAC address stored in the MAC address storing memory 014 (process step 071), or in a case that the DA field (031, 041) of the received frame coincides with a Multicast Address Class1 address specified by WEE (process step 072), the Ethernet OAM processing part 012 proceeds to next process step 073.

In a case that the DA field does not coincide with either of the above in process step 071 or 072, the Ethernet OAM processing part 012 determines that the received frame is not an own device CCM frame, and does not execute any process (process step 076).

In process step 073, it is checked whether a Type field (032, 042) of the received frame contains a value 0x8902 for Ethernet OAM specified by IEEE. In a case that the value of the TYPE field coincides with the value 0x8902 in process step 073, the Ethernet OAM processing part 012 proceeds to next process step 074, whereas in a case that the value of the TYPE field does not coincide, the Ethernet OAM processing part 012 determines that the received frame is not an own device CCM frame and does not execute any process (process step 076).

In process step 074, it is checked whether the received frame is a CCM frame. It is determined whether the received frame is a CCM frame by, for example, checking whether the value of an OpCode field (052) of the received frame is a value 0x01 for a CCM frame specified by ITU-T Y.1731 or IEEE802.1ag.

In a case that the received frame is a CCM frame in process step 074, the Ethernet OAM processing part 012 determines that the received frame is an own device CCM frame and proceeds to next process flow (FIG. 8) (process step 075), whereas in a case that the received frame is not a CCM frame, the Ethernet OAM processing part 012 determines that the received frame is not an own device CCM frame and does not execute any process (process step 076).

FIG. 8 shows a process flow of automatic registration of an MEP according to this exemplary embodiment. As an example, a case that the setting content of the Ethernet OAM table 013 is as shown by FIG. 9 will be described. Moreover, a status transition diagram in a series of processes is shown in FIG. 10.

In this example shown in FIG. 9, it is possible to register four MEPs, and one MEP has already been registered. As MEP Entries, MEP1 (091) has already been registered, whereas MEP2 (092), MEP3 (093) and MEP4 (094) have not been registered yet.

It is assumed that the setting information of MEP1 (091) includes MEL=5 (091-1), MEG ID=MEG0000000001 (091-2), Period=1 s (second) (091-3), MEP ID=1000 (091-4), Peer MEP ID=1001 (091-5), the number of receptions A=three times (091-6), protection timer B=0 second (091-7), and registration status=registered (091-8). MEP2 (092), MEP3 (093) and MEP4 (094) have not been registered yet, and registration statuses thereof are "unregistered" (092-8, 093-8, 094-8).

The MEP Entries have registration statuses (091-8, 092-8, 093-8, 094-8), respectively, and the registration status of each of the MEP Entries transits as shown in the status transition diagram of FIG. 10. The status after transition as shown in the status transition diagram of FIG. 10 is stored into the Ethernet OAM table 013, and corresponds to the registration status (091-8, 092-8, 093-8, 094-8) in FIG. 9.

In the example shown in FIG. 9, MEP1 is in the status of "registered" (103), and "registered" (091-8) as the registration status of MEP1 is stored into the Ethernet OAM table 013. MEP2 (092), MEP3 (093), and MEP4 (094) are in the status of "unregistered" (101), and "unregistered" (092-8, 093-8, 094-8) as the registration statuses of MEP2, MEP3 and MEP4 are stored into the Ethernet OAM table 013. The respective registration statuses represent the following statuses.

As registration statuses of MEP Entries, there are three statuses: unregistered (101); provisionally registered (102); and registered (103).

A status of "unregistered" (101) represents a status in which an MEP has not been registered yet and it is possible to register an MEP from now. AN MEP Entry in the status of "unregistered" (101) is not performing reception check or transmission of CCM frames, and the ETH-CC function is not operating.

A status of "registered" (103) represents a status in which an MEP has already been registered. AN MEP Entry in the status of "registered" (103) is performing reception check and transmission of CCM frames based on the information set in the Ethernet OAM table 013, and the ETH-CC function is completely operating. Moreover, other Ethernet OAM functions such as ETH-LB (Ethernet Loop Back) function and ETH-LT (Ethernet Link Trace) function are also operable.

A status of "provisionally registered" (102) represents a status of a transition period from the status of "unregistered" (101) to the status of "registered" (103). AN MEP Entry in the status of "provisionally registered" (102) is performing only reception check of CCM frames based on the information set in the Ethernet OAM table 013.

When receiving a new CCM frame for an MEP having not been registered in the Ethernet OAM table 013 yet, the Ethernet OAM processing part 012 selects any MEP Entry in the status of "unregistered" (101), and makes the status thereof transit to the status of "provisionally registered" (102).

The status of "provisionally registered" (102) is a status necessary for preventing the registration status of an MEP Entry from immediately transiting to the status of "registered" (103) based on an own device CCM frame transmitted by mistake. After new CCM frames for an MEP having not been registered in the Ethernet OAM table 103 yet are received plural times, the registration status transits from "provisionally registered" (102) to "registered" (103).

The number of receptions necessary for a status transition from "provisionally registered" (102) to "registered" (103) is defined as a number of protections K (a registration threshold). The number of protections K is a value preliminarily set as a fixed value for the Ethernet communication device 011. For example, in a case that the number of protections K is "three times," it is necessary to receive the same CCM frame three times for a transition from the status of "provisionally registered" (102) to the status of "registered" (103). A transition status in which the number of receptions of the same CCM frame has not reached the number of protections K is the status of "provisionally registered" (102).

Further, a parameter of a protection timer B is set and used for automatically deleting a registered MEP. When the registration status of an MEP Entry is "registered" and "provisionally registered," the protection timer B of the MEP Entry is rewritten to a value B+T for every rewriting period T set in advance.

For example, in a case that the rewriting period T is set to 1 s, the values of the protection timers B of all MEP Entries whose registration statuses in the Ethernet OAM table 013 are "registered" and "provisionally registered" are read out every 1 s period and rewritten to values obtained by adding 1 s to the values of B as new values of B. The rewriting period T is a value preliminarily set as a fixed value for the Ethernet communication device 011.

Further, every time a CCM frame for an MEP whose registration status is "registered" and "provisionally registered" is received, the value of the protection timer B of the MEP Entry is rewritten so as to be cleared to 0 s. In a case that a CCM frame for the MEP is not received any more, the protection timer B is not cleared and keeps increasing. However, by preliminarily setting a timer overflow value (a deletion threshold), registration of the MEP is deleted when the protection timer B reaches the timer overflow value. Deletion of registration of an MEP can be performed by rewriting the registration status of the MEP Entry in the Ethernet OAM table 013 to "unregistered."

As shown in FIG. 10, a status transition when the protection timer B reaches the timer overflow value includes a status transition from "registered" (103) to "unregistered" (101) and a status transition from "provisionally registered" (102) to "unregistered" (101). The status after transition is stored into the Ethernet OAM table 013, and the status of "unregistered" (101) is written in as registration status information in the Ethernet OAM table 013, with the result that the MEP of the MEP Entry is deleted. The timer overflow value is also a value previously set as a fixed value for the Ethernet communication device 011.

Next, a process flow of automatic registration of an MEP according to this exemplary embodiment will be described with reference to FIG. 8. For a received frame determined as an own device CCM frame in the process flow of FIG. 7, the Ethernet communication device 011 as this exemplary embodiment operates in accordance with the process flow of FIG. 8.

The Ethernet OAM processing part 012 compares a value of a MEL field (051) of a received frame with an own device MEL value set by the MEL setting switch 015 (process step 081), and proceeds to next process step 082 when the value of the MEL field is equal to or less than the own device MEL value, whereas ends without executing any process when the value of the MEL field is more than the own device MEL value.

In process step 082, the Ethernet OAM processing part 012 compares the respective field values of the received frame with the respective information of all MEP Entries whose registration statuses in the Ethernet OAM table 013 are "registered" or "provisionally registered." In FIG. 9 shown as an example, an MEP Entry whose registration status is "registered" or "provisionally registered" is only MEP1 (091). Therefore, in this case, the Ethernet OAM processing part 012 compares with only the respective information of MEP1 (091). The Ethernet OAM processing part 012 compares the value of the MEL field (051) of the received frame with MEL of MEP1=5 (091-1), the value of the MEG ID field (055) of the received frame with MEG ID of MEP1=MEG0000000001 (091-2), and the Period field (061) of the received frame with Period of MEP1=1 s (091-3).

The Ethernet OAM processing part 012 checks whether there is an MEP Entry that whose values are all coincident with those of the received frame (process step 083), and proceeds to process step 085 when there is an MEP Entry whose values are all coincident with those of the received frame, whereas proceeds to process step 084 when there is not an MEP Entry whose values are all coincident with those of the received frame. In a case that the Ethernet OAM processing part 012 proceeds to process step 084, it is possible to determine that the received frame is not a CCM frame for an MEP registered in the Ethernet OAM table 013 but a CCM frame for the own device, so that an MEP is newly registered to the Ethernet OAM table 013.

In a case that, as the respective field values of the received frame, the value of the MEL field (051) is 4, the value of the MEG ID field (055) is MEG0000000002, the value of the Period field (061) is 10 ms, and the value of the MEP ID field (054) is 2001, the content of the Ethernet OAM table 013 is updated as shown in an example of FIG. 11. That is to say, the respective field values of the received frame are stored as information (112-1 to 112-8) associated with MEP2 (112) of the MEP Entries.

Here, because the value of the MEP ID field (054) of the received frame is the MEP ID value of a frame transmitted by a communicating MEP, it is stored as the Peer MEP ID value (112-5) of MEP2 (112). The MEP ID value (112-4) in the table is MEP ID of the own device, and a value fixed to the device is stored. Examples of the table shown in FIGS. 2, 9, 11 and 12 show a case in which an MEP ID value is fixed to 1000.

As the number of receptions A that is the number of times of reception of an MEP Entry whose values coincide, "once" (112-6) is stored when an MEP is newly registered. As the protection timer B, "0 s" (112-7) is stored when an MEP is newly registered. A registration status transits to a status of "provisionally registered" (102) shown in the status transition diagram of FIG. 10 because a new CCM frame for an unregistered MEP is received, and "provisionally registered" (112-8) is stored into the Ethernet OAM table 013.

When receiving the same CCM frame again in this provisionally registered status, the Ethernet OAM processing part 012 proceeds to process step 082 because it is determined "Yes" in process step 081 as well as described above. Because two MEPs including MEP1 (111) and MEP2 (112) exist as MEP Entries whose registration statuses are "registered" or "provisionally registered," the Ethernet OAM processing part 012 compares the respective field values of the received frames with the respective registration information of the two MEP Entries.

Because all of the values of MEL field (051), MEG ID field (055) and Period field (061) of the received frame are different from MEL value (111-1), MEG ID value (111-2) and Period value (111-3) as the registration information of MEP1, it is possible to determine that the received frame is not a frame for MEP1. Because all of the values coincide with MEL value (112-1), MEG ID value (112-2) and Period value (112-3) as the registration information of MEP2, it is possible to determine that there is an MEP Entry whose values are all coincident in process step 083, and the Ethernet OAM processing part 012 proceeds to process step 085.

In process step 085, the value of MEP ID field (054) of the received frame is compared with Peer MEP ID value (112-5) of MEP2 that is the MEP Entry whose values are all coincident in process step 083. Because the contents of the information coincide, it is possible to determine that there is a coincident MEP Entry in process step 086, and the Ethernet OAM processing part 012 proceeds to next process step 087. If receiving an incoincident frame, the proceeds to process step 084.

In process step 087, the number of receptions A of MEP2 that is the MEP Entry determined to be coincident in process step 086 is compared with the number of protections K unique to the device. In a case that the number of protections K is set to "three times," the number of receptions A of MEP2 is once (112-6) and does not coincide with the number of protections K=three times, so that the Ethernet OAM processing part 012 proceeds to process step 088. In process step 088, the number of receptions A (112-6) of the coincident MEP Entry is rewritten to a value of A+1, and the protection timer B (112-7) is cleared to zero. The registration status remains a status of "provisionally registered" (112-8). The other values (112-1 to 112-5) remain the same values.

In this status that the registration status is "provisionally registered" and the number of receptions A of MEP2 is "twice," when the same frame is further received, the number of receptions A of MEP2 is rewritten to "three times" and the protection timer B is cleared to "0 s" in process step 088.

Thus, when two frames are received after provisional registration, the number of receptions A of MEP2 is rewritten to "three times" and the protection timer B is cleared to "0 s" in process step 088.

When further receiving the same frame in this status that the registration status is "provisionally registered" and the number of receptions A of MEP2 is "three times," the Ethernet OAM processing part 012 proceeds to process step 089 because the number of receptions A of MEP2 is "three times" and coincides with the number of protections K of MEP2 unique to the device.

In process step 089, the registration status is updated to "registered" (122-8) and stored. To describe with reference to the status transition diagram of FIG. 10, in the registration status of "provisionally registered" (102), the number of receptions A "three times" coincides with the number of protections K "three times," and a CCM frame for MEP2 as the MEP is received, so that the registration status transits to "registered" (103). The protection timer B (112-7) is cleared to "0 s." The other values (122-1 to 122-6) of MEP2 remain unchanged.

When the same CCM frame is received after the registration status is thus updated to "registered" (122-8), the protection timer B is cleared to "0 s" (122-7) in process step 089 and the other values (122-1 to 122-6, 122-8) remain unchanged. MEP2 whose registration status is updated to "registered" (122-8) performs reception check and transmission of CCM frames based on the information set in the Ethernet OAM table 013, so that the ETH-CC function completely operates, and other Ethernet OAM functions such as the ETH-LB function and the ETH-LT function also become operable.

Thus, according to the above exemplary embodiment, it becomes possible to automatically register registration information of an MEP for Ethernet OAM operations to an Ethernet communication device located in an MEP position in an ME. Moreover, it also becomes possible to automatically delete registration of an MEP in a case that an Ethernet OAM frame for an own device is not received for a given time.

Further, because it is possible to automatically register an MEP, the need for equipping an Ethernet communication device with an interface for setting registration information and a CPU is eliminated, and it is possible to make a circuit small in size, and it is also possible to reduce power consumption and cost.

Further, because it is possible to automatically register and automatically delete MEPs, it is possible to prevent mistakenly set to an Ethernet communication device. Consequently, it becomes easy to add and reduce an Ethernet communication device to and from an operating network.

Further, according to the above exemplary embodiment, because only information of a specific supervision frame, that is, a CCM frame specified by ITU-T Y.1731 or IEEE802.1ag is used, it is possible to determine whether an MEP is a registration target or not by a simple process. Consequently, it is possible to make a circuit small in size, and it is also possible to reduce power consumption and cost.

Further, because automatic registration and automatic deletion of MEPs by using CCM frames periodically transmitted and received are enabled as Ethernet OAM, a circuit for newly transmitting and receiving specifically defined frames is not necessary, and it is possible to make a circuit small in size and also possible to reduce power consumption and cost. Moreover, without increasing traffic so as not to newly transmit or receive specifically defined frames, it is possible to perform automatic registration and automatic deletion of MEPs.

In general, operations relating to Ethernet OAM are specified by ITU-T Y.1731 or IEEE802.1ag, and the settings for the operations are numerous and complicated. Moreover, transmission and reception of CCM frames between MEPs in each ME is performed not only one-to-one but also one-to-many, and may be performed many-to-many in a mesh network.

According to the above exemplary embodiment, only by registering an MEP to at least one Ethernet communication device located in an MEP position in an ME, it is possible to automate the setting of MEP registration to another Ethernet communication device in an MEP position. Therefore, it is possible to simplify the setting to the Ethernet communication device. As a result, serviceability considerably increases. Moreover, a circuit becomes small in size, which leads to reduction of power consumption and cost.

The respective exemplary embodiments described above are preferred exemplary embodiments of the present invention, but without being limited thereto, the present invention can be embodied while being changed in various manners based on the technical idea of the present invention.

For example, the content of the Ethernet OAM table 13 may be different from the abovementioned content as far as it is possible to perform automatic registration and automatic deletion of MEPs. Moreover, values and configurations may be different from those used as examples in the descriptions of the operations and so on.

Further, the MEL setting switch 015 is not limited to a DIP switch, and may be any switch that can vary depending on settings. Moreover, a switch that cannot vary as in the case of values fixed to a device is also allowed. Besides, regarding parameters described as values set in advance as values fixed to a device, a switch that can vary depending on settings is allowed, and a switch that cannot vary because fixed to a device is also allowed.

Further, the present invention can also be applied to a case that "provisionally registered" (102) is not necessary in a transition from the status of "unregistered" (101) to the status of "registered" (103). In this case, the number of receptions A and the number of protections K are unnecessary values. Moreover, the process flow of FIG. 8 is replaced with FIG. 13, and the status transition diagram of FIG. 10 is replaced with FIG. 14. Since either of the figures does not need the status of "provisionally registered" (102), the number of receptions A and the number of protections K are not used in the figures, and the other contents are the same as in FIGS. 8 and 10 described above.

Further, in the exemplary embodiments described above, in process step 081 in the process flow of FIG. 8, the Ethernet OAM processing part 102 compares a value of a MEL field (051) of a received frame with an own device MEL value set by the MEL setting switch 015, and proceeds to next process step 082 when the value of the MEL field (051) is equal to or less than the own device MEL value, whereas ends without executing any process when the value of the MEL field (051) is more than the own device MEL value. The process in process step 081 may be replaced with a process of comparing a value of a MEL field (051) of a received frame with an own device MEL value set by the MEL setting switch 015, and proceeding to next process step 082 when the value of the MEL field (051) coincides with the own device MEL value, whereas ending without executing any process when the value of the MEL field (051) does not coincide with the own device MEL value.

In this case, the MEL setting switch 015 is used for processing a received frame when the frame has a MEL value of a set value and transmitting a received frame without processing when the frame has a MEL value other than the set value.

Further, in the above description, other Ethernet OAM functions such as the ETH-LB function and the ETH-LT function become operable after an MEP is automatically registered, but an operation of transmitting a Reply frame in response to a Message frame such as a LBM (LoopBack Message) frame and a LTM (Link Trace Message) frame equal to or less than an own device MEL value set by the MEL setting switch 015 before registration of an MEP is also allowed.

Further, as mentioned above with reference to FIG. 15, since a plurality of MELs (MEG Levels) may be set in a network using the Ethernet OAM function, one Ethernet communication device may be equipped with both a function of a maintenance entity group end point device as an MEP and a function of a maintenance intermediate point device as an MIP, or may be equipped with only the function of the maintenance entity group end point device as an MEP, or may be equipped with only the function of the maintenance intermediate point device as an MIP.

Further, a device with no MEP set may be included in a network and, in this case, the device transmits all Ethernet OAM frames.

Further, the Ethernet communication device as the exemplary embodiment described above may realize each function of the exemplary embodiment described above by a setting circuit by a FPGA (field programmable gate array), or may realize each function of the exemplary embodiment described above by execution of a process by a processing means such as a CPU based on a program.

Thus, by recording a procedure of a process for realizing the Ethernet communication device as the exemplary embodiment described above on a recording medium as a program, it is possible to realize the respective functions described above of the present invention by causing a CPU of a computer configuring a system to execute the process by the program supplied from the recording medium.

In this case, the present invention is also applied to a case that an information group including the program is supplied to an output device from the recording medium described above or from an external recording medium via a network.

That is to say, a program code read out from the recording medium realizes a new function of the present invention, and the recording medium storing the program code and a signal read out from the recording medium configure the present invention.

As this recording medium, for example, a hard disk, an optical disk, a magneto-optical disk, a Floppy™ disk, a magnetic tape, a nonvolatile memory card, a ROM, and the like may be used.

According to the program and the setting circuit according to the present invention, it is possible to cause a communication device controlled by the program and the setting circuit to realize each function in the aforementioned exemplary embodiment.

[Supplementary Notes]

The whole or part of the exemplary embodiments disclosed above can be described as, but not limited to, the following supplementary notes.

(Supplementary Note 1)

A communication device used for a communication system performing supervision of a network status by transmitting and receiving supervision frames between maintenance entity group end point devices every predetermined time, the communication device comprising:

a receiving means for receiving the supervision frames;

a management table for managing identification information of the maintenance entity group end point devices that are transmission sources of the supervision frames; and a registering means for, in a case that identification information of a maintenance entity group end point device that is a transmission source of a supervision frame received by the receiving means is not registered in the management table, registering the identification information of the maintenance entity group end point device into the management table.

(Supplementary Note 2)

The communication device according to Supplementary Note 1, comprising:

a timing means for, regarding each of the identification information of the maintenance entity group end point devices registered in the management table, measuring an elapsed time after reception of a supervision frame from the maintenance entity group end point device identified by the identification information by the receiving means; and a deleting means for, regarding at least any of the identification information of the maintenance entity group end point devices registered in the management table, when a supervision frame from the maintenance entity group end point device identified by the identification information is not received even though the elapsed time measured by the timing means becomes equal to or more than a predetermined deletion threshold, deleting the identification information of the maintenance entity group end point device from the management table.

(Supplementary Note 3)

The communication device according to Supplementary Note 2, wherein:

the management table stores the identification information of the maintenance entity group end point devices in association with elapsed times measured by the tuning means regarding the maintenance entity group end point devices; and the registering means determines whether the elapsed time measured by the timing means regarding each of the maintenance entity group end point devices is equal to or more than the predetermined deletion threshold, based on the elapsed times stored in the management table.

(Supplementary Note 4')

The communication device according to any of Supplementary Notes 1 to 3, wherein in a case that the identification information of the maintenance entity group end point device that is the transmission source of the supervision frame received by the receiving means is not registered in the management table and a number of receptions of supervision frames from the maintenance entity group end point device is equal to or more than a predetermined registration threshold, the registering means registers the identification information of the maintenance entity group end point device in a registered status into the management table.

(Supplementary Note 4)

The communication device according to any of Supplementary Notes 1 to 3, wherein:

in a case that the identification information of the maintenance entity group end point device that is the transmission source of the supervision frame received by the receiving means is not included in the management table, the registering means registers the identification information of the maintenance entity group end point device in a provisionally registered status;

in a case that the identification information of the maintenance entity group end point device that is the transmission source of the supervision frame received by the receiving means is registered in the provisionally registered status in the management table and a number of receptions of supervision frames from the maintenance entity group end point device is less than a predetermined registration threshold, the registering means registers the identification information of the maintenance entity group end point device still in the provisionally registered status; and in a case that the identification information of the maintenance entity group end point device that the a transmission source of a supervision frame received by the receiving means is registered in the provisionally registered status in the management table and a number of receptions of supervision frames from the maintenance entity group end point device is equal to or more than the predetermined registration threshold, the registering means registers the identification information of the maintenance entity group end point device in the registered status.

(Supplementary Note 5)

The communication device according to Supplementary Note 4, wherein:

the management table stores the identification information of the maintenance entity group end point devices in association with numbers of receptions of supervision frames from the maintenance entity group end point devices; and the registering means determines a registration status of registering the identification information of the maintenance entity group end point device that is the transmission source of the supervision frame received by the receiving means, based on the numbers of the receptions stored in the management table.

(Supplementary Note 6)

A communication system performing supervision of a network status by transmitting and receiving supervision frames between maintenance entity group end point devices every predetermined time, wherein at least one communication device in the communication system comprises:

a receiving means for receiving the supervision frames;

a management table for managing identification information of the maintenance entity group end point devices that are transmission sources of the supervision frames; and a registering means for, in a case that identification information of a maintenance entity group end point device that is a transmission source of a supervision frame received by the receiving means is not registered in the management table, registering the identification information of the maintenance entity group end point device into the management table.

(Supplementary Note 7)

The communication system according to Supplementary Note 6, wherein the communication device comprises:

a timing means for, regarding each of the identification information of the maintenance entity group end point devices registered in the management table, measuring an elapsed time after reception of a supervision frame from the maintenance entity group end point device identified by the identification information by the receiving means; and a deleting means for, regarding at least any of the identification information of the maintenance entity group end point devices registered in the management table, when a supervision frame from the maintenance entity group end point device identified by the identification information is not received even though the elapsed time measured by the timing means becomes equal to or more than a predetermined deletion threshold, deleting the identification information of the maintenance entity group end point device from the management table.

(Supplementary Note 8)

The communication system according to Supplementary Note 7, wherein:

the management table stores the identification information of the maintenance entity group end point devices in association with elapsed times measured by the timing means regarding the maintenance entity group end point devices; and the registering means determines whether the elapsed time measured by the timing means regarding each of the maintenance entity group end point devices is equal to or more than the predetermined deletion threshold, based on the elapsed times stored in the management table.

(Supplementary Note 9)

The communication system according to any of Supplementary Notes 6 to 8, wherein:

in a case that the identification information of the maintenance entity group end point device that is the transmission source of the supervision frame received by the receiving means is not included in the management table, the registering means registers the identification information of the maintenance entity group end point device in a provisionally registered status;

in a case that the identification information of the maintenance entity group end point device that is the transmission source of the supervision frame received by the receiving means is registered in the provisionally registered status in the management table and a number of receptions of supervision frames from the maintenance entity group end point device is less than a predetermined registration threshold, the registering means registers the identification information of the maintenance entity group end point device still in the provisionally registered status; and in a case that the identification information of the maintenance entity group end point device that the a transmission source of a supervision frame received by the receiving means is registered in the provisionally registered status in the management table and a number of receptions of supervision frames from the maintenance entity group end point device is equal to or more than the predetermined registration threshold, the registering means registers the identification information of the maintenance entity group end point device in the registered status.

(Supplementary Note 10)

The communication system according to Supplementary Note 9, wherein:

the management table stores the identification information of the maintenance entity group end point devices in association with numbers of receptions of supervision frames from the maintenance entity group end point devices; and the registering means determines a registration status of registering the identification information of the maintenance entity group end point device that is the transmission source of the supervision frame received by the receiving means, based on the numbers of the receptions stored in the management table.

(Supplementary Note 11)

A setting method in a communication system performing supervision of a network status by transmitting and receiving supervision frames between maintenance entity group end point devices every predetermined time, wherein at least one communication device in the communication system comprises a management table for managing identification information of the maintenance entity group end point devices that are transmission sources of the supervision frames, the setting method comprising:

receiving the supervision frames, by the communication device; and in a case that identification information of a maintenance entity group end point device that is a transmission source of a supervision frame received in the receiving is not registered in the management table, registering the identification information of the maintenance entity group end point device into the management table.

(Supplementary Note 12)

The setting method according to Supplementary Note 11, comprising:

regarding each of the identification information of the maintenance entity group end point devices registered in the management table, measuring an elapsed time after reception of a supervision frame from the maintenance entity group end point device identified by the identification information by the receiving; and regarding at least any of the identification information of the maintenance entity group end point devices registered in the management table, when a supervision frame from the maintenance entity group end point device identified by the identification information is not received even though the elapsed time measured by the timing becomes equal to or more than a predetermined deletion threshold, deleting the identification information of the maintenance entity group end point device from the management table.

(Supplementary Note 13)

The setting method according to Supplementary Note 12, wherein:

the management table stores the identification information of the maintenance entity group end point devices in association with elapsed times measured by the timing regarding the maintenance entity group end point devices; and in the registering, it is determined whether the elapsed time measured by the timing regarding each of the maintenance entity group end point devices is equal to or more than the predetermined deletion threshold, based on the elapsed times stored in the management table.

(Supplementary Note 14)

The setting method according to any of Supplementary Notes 11 to 13, wherein in the registering:

in a case that the identification information of the maintenance entity group end point device that is the transmission source of the supervision frame received by the receiving is not included in the management table, the identification information of the maintenance entity group end point device is registered in a provisionally registered status;

in a case that the identification information of the maintenance entity group end point device that is the transmission source of the supervision frame received by the receiving is registered in the provisionally registered status in the management table and a number of receptions of supervision frames from the maintenance entity group end point device is less than a predetermined registration threshold, the identification information of the maintenance entity group end point device is registered still in the provisionally registered status; and in a case that the identification information of the maintenance entity group end point device that the a transmission source of a supervision frame received by the receiving is registered in the provisionally registered status in the management table and a number of receptions of supervision frames from the maintenance entity group end point device is equal to or more than the predetermined registration threshold, the identification information of the maintenance entity group end point device is registered in the registered status.

(Supplementary Note 15)

The setting method according to Supplementary Note 14, wherein:

the management table stores the identification information of the maintenance entity group end point devices in association with numbers of receptions of supervision frames from the maintenance entity group end point devices; and in the registering, determining a registration status of registering the identification information of the maintenance entity group end point device that is the transmission source of the supervision frame received by the receiving, based on the numbers of the receptions stored in the management table.

(Supplementary Note 16)

A setting program of a communication device used for a communication system performing supervision of a network status by transmitting and receiving supervision frames between maintenance entity group end point devices every predetermined time, wherein the communication device comprises a management table for managing identification information of the maintenance entity group end point devices that are transmission sources of the supervision frames, the setting program comprising instructions for causing a computer of the communication device to execute:

receiving the supervision frames; and in a case that identification information of a maintenance entity group end point device that is a transmission source of a supervision frame received by the receiving is not registered in the management table, registering the identification information of the maintenance entity group end point device into the management table.

(Supplementary Note 17)

The setting program according to Supplementary Note 16, comprising:

regarding each of the identification information of the maintenance entity group end point devices registered in the management table, measuring an elapsed time after reception of a supervision frame from the maintenance entity group end point device identified by the identification information by the receiving; and regarding at least any of the identification information of the maintenance entity group end point devices registered in the management table, when a supervision frame from the maintenance entity group end point device identified by the identification information is not received even though the elapsed time measured by the timing becomes equal to or more than a predetermined deletion threshold, deleting the identification information of the maintenance entity group end point device from the management table.

(Supplementary Note 18)

The setting program according to Supplementary Note 17, wherein:

the management table stores the identification information of the maintenance entity group end point devices in association with elapsed times measured by the timing regarding the maintenance entity group end point devices; and in the registering, it is determined whether the elapsed time measured by the timing regarding each of the maintenance entity group end point devices is equal to or more than the predetermined deletion threshold, based on the elapsed times stored in the management table.

(Supplementary Note 19)

The setting program according to any of Supplementary Notes 16 to 18, wherein in the registering:

in a case that the identification information of the maintenance entity group end point device that is the transmission source of the supervision frame received by the receiving is not included in the management table, the identification information of the maintenance entity group end point device is registered in a provisionally registered status;

in a case that the identification information of the maintenance entity group end point device that is the transmission source of the supervision frame received by the receiving is registered in the provisionally registered status in the management table and a number of receptions of supervision frames from the maintenance entity group end point device is less than a predetermined registration threshold, the identification information of the maintenance entity group end point device is registered still in the provisionally registered status; and in a case that the identification information of the maintenance entity group end point device that the a transmission source of a supervision frame received by the receiving is registered in the provisionally registered status in the management table and a number of receptions of supervision frames from the maintenance entity group end point device is equal to or more than the predetermined registration threshold, the identification information of the maintenance entity group end point device is registered in the registered status.

(Supplementary Note 20)

The setting program according to Supplementary Note 19, wherein:

the management table stores the identification information of the maintenance entity group end point devices in association with numbers of receptions of supervision frames from the maintenance entity group end point devices; and in the registering, a registration status of registering the identification information of the maintenance entity group end point device that is the transmission source of the supervision frame received by the receiving is determined based on the numbers of the receptions stored in the management table.

(Supplementary Note 21)

A setting circuit of a communication device used for a communication system performing supervision of a network status by transmitting and receiving supervision frames between maintenance entity group end point devices every predetermined time, the setting circuit comprising:

a receiving means for receiving the supervision frames;

a management table for managing identification information of the maintenance entity group end point devices that are transmission sources of the supervision frames; and a registering means for, in a case that identification information of a maintenance entity group end point device that is a transmission source of a supervision frame received by the receiving means is not registered in the management table, registering the identification information of the maintenance entity group end point device into the management table.

(Supplementary Note 22)

The setting circuit according to Supplementary Note 21, comprising:

a timing means for, regarding each of the identification information of the maintenance entity group end point devices registered in the management table, measuring an elapsed time after reception of a supervision frame from the maintenance entity group end point device identified by the identification information by the receiving means; and a deleting means for, regarding at least any of the identification information of the maintenance entity group end point devices registered in the management table, when a supervision frame from the maintenance entity group end point device identified by the identification information is not received even though the elapsed time measured by the timing means becomes equal to or more than a predetermined deletion threshold, deleting the identification information of the maintenance entity group end point device from the management table.

(Supplementary Note 23)

The setting circuit according to Supplementary Note 22, wherein:

the management table stores the identification information of the maintenance entity group end point devices in association with elapsed times measured by the timing means regarding the maintenance entity group end point devices; and the registering means determines whether the elapsed time measured by the timing means regarding each of the maintenance entity group end point devices is equal to or more than the predetermined deletion threshold, based on the elapsed times stored in the management table.

(Supplementary Note 24)

The setting circuit according to any of Supplementary Notes 21 to 23, wherein:

in a case that the identification information of the maintenance entity group end point device that is the transmission source of the supervision frame received by the receiving means is not included in the management table, the registering means registers the identification information of the maintenance entity group end point device in a provisionally registered status;

in a case that the identification information of the maintenance entity group end point device that is the transmission source of the supervision frame received by the receiving means is registered in the provisionally registered status in the management table and a number of receptions of supervision frames from the maintenance entity group end point device is less than a predetermined registration threshold, the registering means registers the identification information of the maintenance entity group end point device still in the provisionally registered status; and in a case that the identification information of the maintenance entity group end point device that the a transmission source of a supervision frame received by the receiving means is registered in the provisionally registered status in the management table and a number of receptions of supervision frames from the maintenance entity group end point device is equal to or more than the predetermined registration threshold, the registering means registers the identification information of the maintenance entity group end point device in the registered status.

(Supplementary Note 25)

The setting circuit according to Supplementary Note 24, wherein:

the management table stores the identification information of the maintenance entity group end point devices in association with numbers of receptions of supervision frames from the maintenance entity group end point devices; and the registering means determines a registration status of registering the identification information of the maintenance entity group end point device that is the transmission source of the supervision frame received by the receiving means, based on the numbers of the receptions stored in the management table.

Although the present invention has been described with reference to the respective exemplary embodiments described above, the present invention is not limited to the aforementioned exemplary embodiments. The configuration and details of the present invention can be altered in various manners that can be understood by those skipped in the art within the scope of the present invention.

The present invention is based upon and claims the benefit of priority from Japanese patent application No. 2010-083585, filed on Mar. 31, 2010, the disclosure of which is incorporated herein in its entirety by reference.

INDUSTRIAL APPLICABILITY

The present invention can be applied to all fields of communication devices using Ethernet OAM.

DESCRIPTION OF NUMERALS

011 Ethernet communication device
012 Ethernet OAM processing part
013 Ethernet OAM table
014 MAC address storing memory
015 MEL setting switch (parameter setting switch)

The invention claimed is:

1. A communication device used for a communication system performing supervision of a network status by transmitting and receiving supervision frames between maintenance entity group end point devices every predetermined time, the communication device comprising:
   a receiving unit for receiving the supervision frames;
   a management table for managing identification information of the maintenance entity group end point devices that are transmission sources of the supervision frames;
   a registering unit for, when identification information of one of the maintenance entity group end point devices that is a source of one of the supervision frames received by the receiving unit is not registered in the management table, registering the identification information of the maintenance entity group end point device into the management table;
   a timing unit for, regarding each of the identification information of the maintenance entity group end point devices registered in the management table, measuring an elapsed time after reception of the supervision frame from the maintenance entity group end point device identified by the identification information by the receiving unit; and
   a deleting unit for, regarding at least any of the identification information of the maintenance entity group end point devices registered in the management table, when a supervision frame from the maintenance entity group end point device identified by the identification information is not received even though the elapsed time measured by the timing unit becomes equal to or more than a predetermined deletion threshold, deleting the identification information of the maintenance entity group end point device from the management table.

2. The communication device according to claim 1, wherein:
   the management table stores the identification information of the maintenance entity group end point devices in association with elapsed times measured by the timing unit regarding the maintenance entity group end point devices; and
   the registering unit determines whether the elapsed time measured by the timing unit regarding each of the maintenance entity group end point devices is equal to or more than the predetermined deletion threshold, based on the elapsed times stored in the management table.

3. The communication device according to claim 2, wherein when the identification information of the maintenance entity group end point device that is the source of the supervision frame received by the receiving unit is not registered in the management table and a number of receptions of supervision frames from the maintenance entity group end point device is equal to or more than a predetermined registration threshold, the registering unit registers the identification information of the maintenance entity group end point device in a registered status into the management table.

4. The communication device according to claim 2, wherein:
when the identification information of the maintenance entity group end point device that is the source of the supervision frame received by the receiving unit is not included in the management table, the registering unit registers the identification information of the maintenance entity group end point device in a provisionally registered status;
when the identification information of the maintenance entity group end point device that is the source of the supervision frame received by the receiving unit is registered in the provisionally registered status in the management table and a number of receptions of supervision frames from the maintenance entity group end point device is less than a predetermined registration threshold, the registering unit registers the identification information of the maintenance entity group end point device still in the provisionally registered status; and
when the identification information of the maintenance entity group end point device that the a source of a supervision frame received by the receiving unit is registered in the provisionally registered status in the management table and a number of receptions of supervision frames from the maintenance entity group end point device is equal to or more than the predetermined registration threshold, the registering unit registers the identification information of the maintenance entity group end point device in the registered status.

5. The communication device according to claim 1, wherein when the identification information of the maintenance entity group end point device that is the source of the supervision frame received by the receiving unit is not registered in the management table and a number of receptions of supervision frames from the maintenance entity group end point device is equal to or more than a predetermined registration threshold, the registering unit registers the identification information of the maintenance entity group end point device in a registered status into the management table.

6. The communication device according to claim 1, wherein:
when the identification information of the maintenance entity group end point device that is the source of the supervision frame received by the receiving unit is not included in the management table, the registering unit registers the identification information of the maintenance entity group end point device in a provisionally registered status;
when the identification information of the maintenance entity group end point device that is the source of the supervision frame received by the receiving unit is registered in the provisionally registered status in the management table and a number of receptions of supervision frames from the maintenance entity group end point device is less than a predetermined registration threshold, the registering unit registers the identification information of the maintenance entity group end point device still in the provisionally registered status; and
when the identification information of the maintenance entity group end point device that the a source of a supervision frame received by the receiving unit is registered in the provisionally registered status in the management table and a number of receptions of supervision frames from the maintenance entity group end point device is equal to or more than the predetermined registration threshold, the registering unit registers the identification information of the maintenance entity group end point device in the registered status.

7. The communication device according to claim 6, wherein:
the maintenance table stores the identification information of the maintenance entity group end point devices in association with numbers of receptions of supervision frames from the maintenance entity group end point devices; and
the registering unit determines a registration status of registering the identification information of the maintenance entity group end point device that is the source of the supervision frame received by the receiving unit, based on the numbers of the receptions stored in the management table.

8. A setting method in a communication system performing supervision of a network status by transmitting and receiving supervision frames between maintenance entity group end point devices every predetermined time, wherein at least one communication device in the communication system comprises a management table for managing identification information of the maintenance entity group end point devices that are transmission sources of the supervision frames, the setting method comprising:
receiving the supervision frames, by the communication device; and
when identification information of one of the maintenance entity group end point devices that is a source of one of the received supervision frames is not registered in the management table, registering the identification information of the maintenance entity group end point device into the management table;
measuring, by a timing unit for each of the identification information of the maintenance entity group end point devices registered in the management table, an elapsed time after reception of the supervision frame from the maintenance entity group end point device identified by the identification information; and
deleting, by a deleting unit, for at least any of the identification information of the maintenance entity group end point devices registered in the management table when a supervision frame from the maintenance entity group end point device identified by the identification information is not received even though the elapsed time measured by the timing unit becomes equal to or more than a predetermined deletion threshold, the identification information of the maintenance entity group end point device from the management table.

9. A non-transitory computer-readable storage medium that stores a setting program of a communication device used for a communication system performing supervision of a network status by transmitting and receiving supervision frames between maintenance entity group end point devices every predetermined time, wherein the communication device comprises a management table for managing identification information of the maintenance entity group end point devices that are transmission sources of the supervision frames, the setting program comprising instructions for causing a computer of the communication device to execute a method, the method comprising:

receiving the supervision frames; and when identification information of one of the maintenance entity group end point devices that is a source of one of the received supervision frames is not registered in the management table, registering the identification information of the maintenance entity group end point device into the management table;

measuring, by a timing unit for each of the identification information of the maintenance entity group end point devices registered in the management table, an elapsed time after reception of the supervision frame from the maintenance entity group end point device identified by the identification information; and deleting, by a deleting unit, for at least any of the identification information of the maintenance entity group end point devices registered in the management table when a supervision frame from the maintenance entity group end point device identified by the identification information is not received even though the elapsed time measured by the timing unit becomes equal to or more than a predetermined deletion threshold, the identification information of the maintenance entity group end point device from the management table.

\* \* \* \* \*